Figure 1:
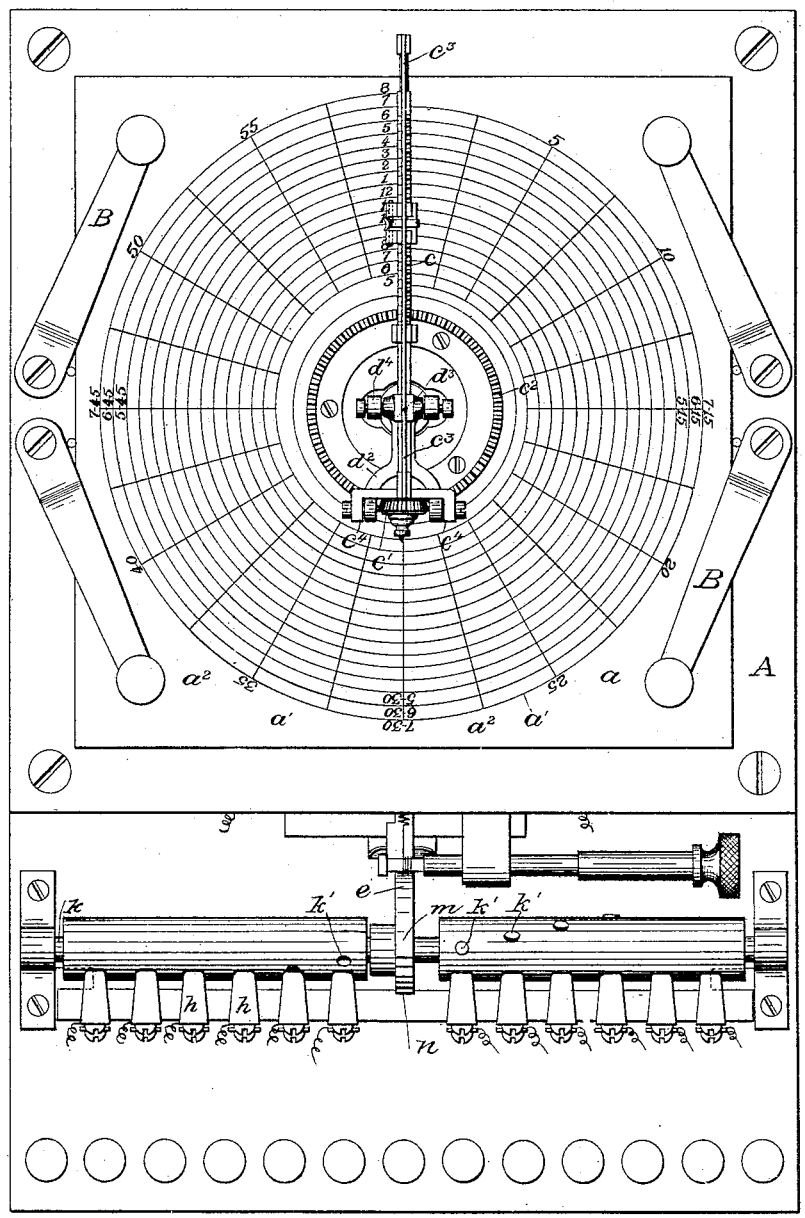

(No Model.) 5 Sheets—Sheet 1.

J. E. TARBOX & E. H. TAYLOR.
WATCHMAN'S TIME RECORDER.

No. 338,315. Patented Mar. 23, 1886.

Witnesses.
John F. Nelson
John F. C. Prinkert

Inventors
James E. Tarbox
Eugene H. Taylor
by Crosby & Gregory
Attys (No Model.) 5 Sheets—Sheet 2.

J. E. TARBOX & E. H. TAYLOR.
WATCHMAN'S TIME RECORDER.

No. 338,315. Patented Mar. 23, 1886.

Witnesses.
John F. Nelson.
John F. C. Prinkert.

Inventors.
James E. Tarbox
Eugene H. Taylor
by Crosby Gregory attys (No Model.) 5 Sheets—Sheet 3.
J. E. TARBOX & E. H. TAYLOR.
WATCHMAN'S TIME RECORDER.
No. 338,315. Patented Mar. 23, 1886.
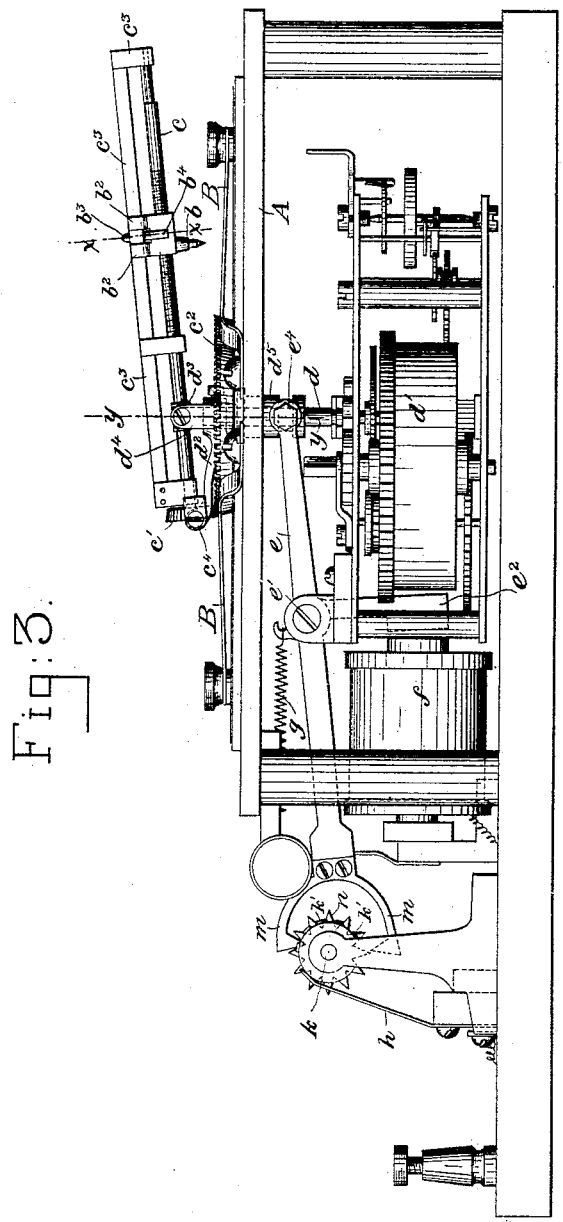

(No Model.) 5 Sheets—Sheet 4.
J. E. TARBOX & E. H. TAYLOR.
WATCHMAN'S TIME RECORDER.
No. 338,315. Patented Mar. 23, 1886.
Fig: 6.
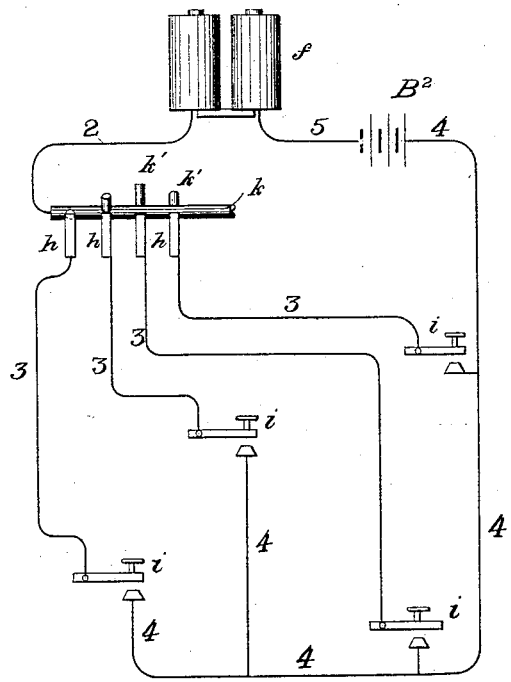
Fig: 4.
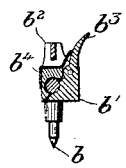
Fig: 5.
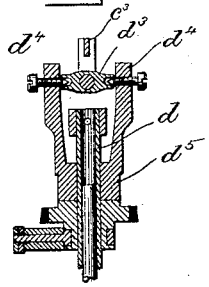
Witnesses.
John F. Nelson.
John F. C. Pinkerth.
Inventors.
James E. Tarbox
Eugene H. Taylor
by Crosby Gregory
attys (No Model.) 5 Sheets—Sheet 5.
J. E. TARBOX & E. H. TAYLOR.
WATCHMAN'S TIME RECORDER.
No. 338,315. Patented Mar. 23, 1886.
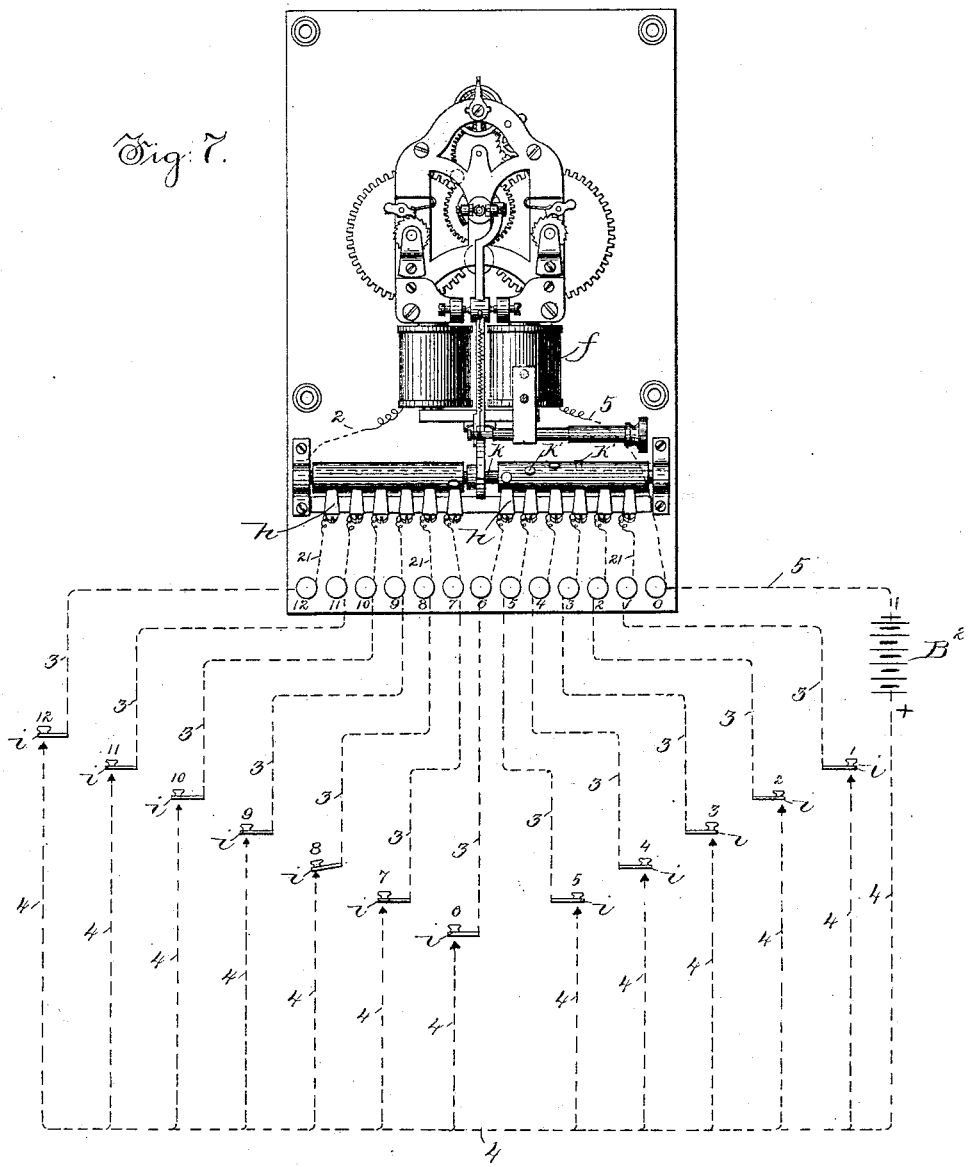

UNITED STATES PATENT OFFICE.

JAMES E. TARBOX AND EUGENE H. TAYLOR, OF LYNN, MASS., ASSIGNORS TO THE TARBOX TIME REGISTER COMPANY, OF PORTLAND, ME.

WATCHMAN'S TIME-RECORDER.

SPECIFICATION forming part of Letters Patent No. 338,315, dated March 23, 1886.

Application filed April 13, 1885. Serial No. 162,128. (No model.)

*To all whom it may concern:*

Be it known that we, JAMES E. TARBOX and EUGENE H. TAYLOR, of Lynn, county of Essex, and State of Massachusetts, have invented an Improvement in a Watchman's Time-Detector, of which the following description, in connection with the accompanying drawings, is a specification, like letters on the drawings representing like parts.

Our invention relates to a watchman's time-detector of that class in which the watchman upon visiting each of the rooms or stations in his care causes a record to be made of the time at which he visited the station and operated a suitable device, shown in this instance as a circuit-closer.

The invention consists, partly, in appliances which necessitate that the watchman must visit the stations in a certain definite order so as to make a proper record, so that if he neglects any one station he will not only fail to make a record at that station, but also at all the succeeding stations, and he can obtain no further record until after he has visited the station that has been thus neglected. The record is made on a dial substantially such as shown in Letters Patent No. 293,684, granted February 19, 1884, to which reference may be had, the same consisting of a series of spaces or graduations arranged spirally on a plane surface and co-operating with a revolving arm actuated by clock-work or made with a uniform movement, preferably the same as that of the minute-hand of a clock, the said arm being provided with a marking device normally disengaged from the surface of the dial and having a longitudinal movement in the said arm proportional to the revolving movement of the latter, so that the said marking device travels in a spiral path corresponding to the spiral divisions or graduations on the dial. The said marking device is caused to engage the surface of the dial and make a mark thereon when the watchman arrives at the proper station and operates a device provided for that purpose; and in the present invention the said marking device is actuated or moved into engagement with the dial to mark the same by means of an electro-magnet, the circuit of which is controlled from the said station.

The invention consists, partly, in the combination, with the dial and marking device and an electro-magnet for actuating the same, of a circuit-changing device actuated by the said magnet, by which a circuit is provided for the latter to the next station in the series, the said circuit-changing device connecting the magnet in circuit with but one station at a time, and consequently rendering the said magnet inoperative from any of the other stations, so that no effect upon the registering mechanism will be produced unless the proper station is visited, when the operator will place the magnet in circuit with the next station, and so on.

The invention further consists in various details of construction of the marking device, the circuit-changing device, and the mechanism by which the latter is operated.

Figure 2:
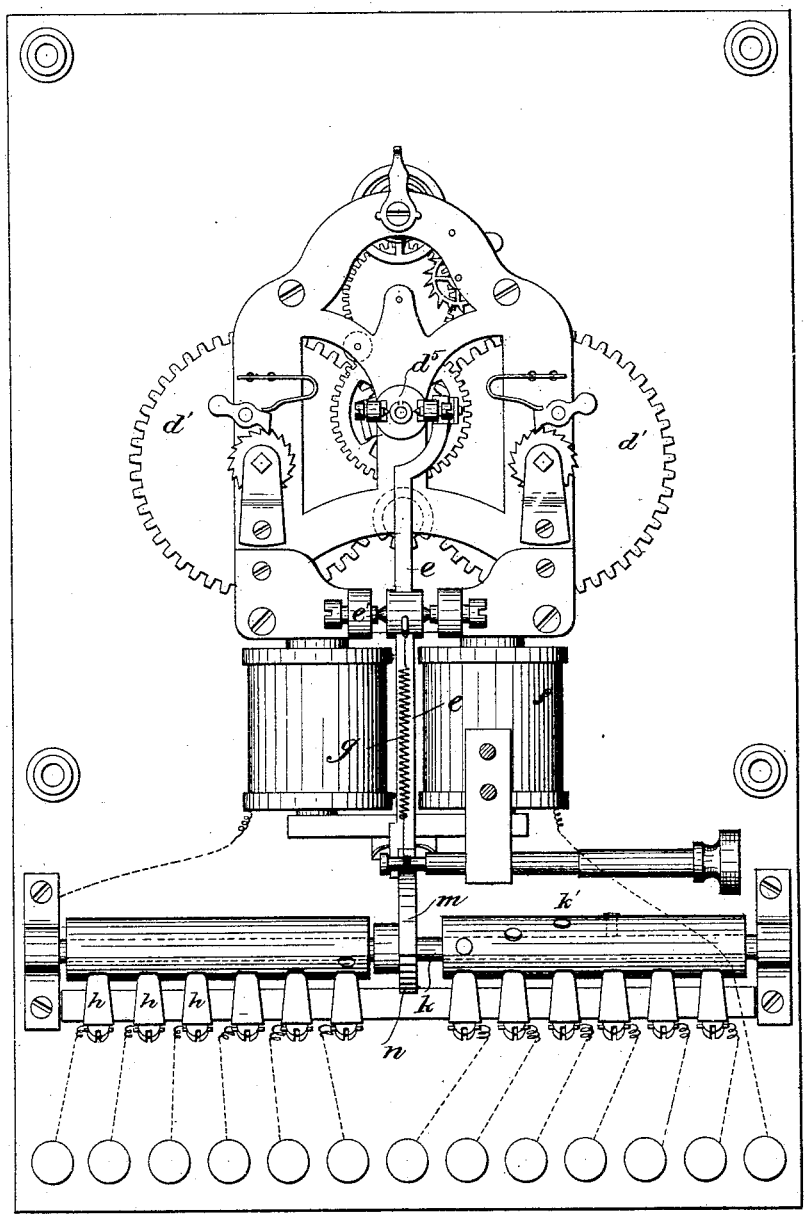

Figure 1 is a plan view of a watchman's detector embodying this invention; Fig. 2, a plan view of the clock-work and devices below the dial; Fig. 3, a side elevation of the watchman's detector removed from its inclosing-case; Figs. 4 and 5, details to be referred to, and Fig. 6 a diagram representing the circuits connecting the detector with the different stations to be visited. Fig. 7 is a diagram illustrating the circuit-connections between the different stations and the circuit-controlling device attached to the clock, the marker and top plate being removed.

The dial $a$, which may consist of a sheet of paper adapted to be easily applied to and removed from the main frame-plate A of the apparatus, so that a new dial may be applied each day, is marked off by a spiral line, $a'$, and radial lines $a^2$ into a series of spiral graduations or spaces, substantially as in the former patent referred to, the said dial co-operating with a marking device, $b$, (see Fig. 3,) connected with a screw-threaded shaft, $c$, provided with a bevel-pinion, $c'$, meshing with a stationary gear, $c^2$, surrounding the central opening of the frame-plate, in which the arbor $d$ of the clock-work and devices carried thereby operate, the said gear being substantially concentric with graduations of the dial. The marker $b$ consists in this instance of a needle or pointed projections, which, when pressed down against the dial $a$, pierces the same, the said dial being supported on a sheet of soft rubber or other suitable cushioning material, which permits the point of the marker to pierce the dial without injury to the said point. The dial $a$ is shown as held upon the cushion by spring-arms B, pivoted on the main frame-plate A, so as to be turned aside when a dial is to be removed and a new one substituted. The said arbor $d$ is actuated by a clock-work or motor, $d'$, (shown in Figs. 2 and 3,) by which the said arbor is caused to rotate once an hour, so that the shaft $c$, connected therewith, as will be described, revolves once in an hour, like the minute-hand of a clock, carrying the marker $b$ once around the dial, the graduations of which are divided by the radial lines into five or two-and-a-half minute spaces, or spaces through which the said marker $b$ will travel in such intervals of time. The shaft $c$ has bearings in a frame, $c^3$, pivoted at $c^4$ in a forked arm, $d^2$, fixed upon the arbor $d$, so as to turn therewith, thus revolving the frame $c^3$ and shaft $c$ around over the dial.

The shaft $c$ has upon it a sleeve, $d^3$, pivoted in uprights $d^4$, extending from a sleeve, $d^5$, which turns with the said arbor, but is free to move longitudinally thereon. Normally the sleeve $d^5$ is in its highest position, thus supporting the frame $c^3$ and shaft $c$ with the marker $b$ at a short distance above the dial, as shown in Fig. 3.

The stationary gear $c^2$, by its engagements with the pinion $c'$, produces a rotation of the shaft $c$ about its axis simultaneous with and proportional to its movement around the axis of the arbor $d$, and the shaft $c$ is screw-threaded and engages a nut or threaded piece, $b'$, connected with the marker $b$, which is restrained from rotating with the shaft $c$ by a guide projection, $b^2$, engaging the frame $c^3$, so that the rotary movement of the shaft $c$ produces a longitudinal movement of the marker $b$ thereon, or, in other words, a radial movement with relation to the circuits in which the said arm revolves.

The gears $c'$ $c^2$ and screw-thread are so proportioned that the radial movement of the marker in one complete revolution of the arm is just equal to the distance between two successive convolutions of the spiral on the dial $a$, so that the marker $b$ will exactly follow the spiral line of graduations on the dial, the different lines of which thus represent successive hours, which are marked to indicate the time between five in the afternoon and seven o'clock in the following morning, the interval during which the watchman is to make the rounds of the building or premises.

The nut $b'$ does not entirely encircle the thread of the shaft $c$, but merely engages the threads at one side of the shaft, and is itself connected with or made as a part of an arm, $b^3$, pivoted in the upright or guide $b^2$ of the marker $b$.

The arm $b^3$, with the nut $b'$, is normally caused to engage the threaded shaft $c$ by the spring $b^4$, (see Fig. 4,) and the said nut may thus be raised out of engagement with the thread, permitting the marker $b$ to slide longitudinally on the said arm $c$, so that the marking-point $b$ may be set at any desired distance from the axis of revolution of the arm, according to the time of day that it may be when the apparatus has to be set in operation.

The marker $b$ is caused to strike the surface of the dial and make a mark thereon by depressing the sleeve $d^5$, which is actuated or moved longitudinally by the armature-lever $e$, pivoted at $e'$, and provided with an armature, $e^2$, of an electro-magnet, $f$, which, when energized by closing its circuit, depresses the sleeve $d^5$ and shaft $c$, connected therewith, by the fork $d^2$ and sleeve $d^3$, thus forcing the marker $b$ against the dial.

The armature-lever $e$ is provided with a projection, $e^4$, entering a groove around the sleeve $d^5$, as shown in Fig. 3, so as to move the said sleeve longitudinally without interfering with its rotary movement.

The armature-lever $e$ is connected with a retracting-spring, $g$, which withdraws the armature from the poles of the magnet when demagnetized, restoring the armature-lever to its normal position.

The circuit of the magnet $f$, as shown in diagram, Fig. 6, includes a wire, 2, connecting one terminal of the said magnet with one member of each of a series of circuit-closers, $h$, a portion only of which are shown in Fig. 6, the other members of which circuit-closers are connected by branch wires 3 with the different stations to be visited by the watchman, when the said wires 3 are connected, each with one member of a normally-open circuit-closer, $i$, the other member of which is connected by a battery-wire, 4, with one pole of the battery $B^2$, the other pole of which is connected by wire 5 with the other terminal of the magnet $f$. It is thus essential, in order to cause a current to engage the magnet $f$, that both the circuit-closers $h$ and $i$, connected by one of the branch wires 3, should be closed at the same moment, and if the circuit-closer $h$, corresponding to any station, is open, it will be of no use to close the circuit-closer $i$ at the said station, as no effect upon the magnet $f$ and marker $b$ will be produced.

The circuit-closers $h$ are automatically closed one at a time, so as to afford a circuit for one of the stations by means of a circuit-controlling device, consisting of a shaft, $k$, having arranged around and along it a series of contact-pieces, $k'$, each constituting one member of each of the circuit-closers $h$, which are all arranged along the said shaft, the projections $k'$ being at different angular positions around the axis of the said shaft, so that they are brought one at a time into engagement, each with the corresponding contact-spring constituting the other member of the different circuit-closers $h$, closing the same, while all the others of the said circuit-closers remain open.

The contact-pieces $k'$, which are in electrical connection with the shaft $k$, are preferably embedded in a drum or cylinder of insulating material, as shown, projecting sufficiently therefrom to engage the ends of the springs $h$. The shaft $k$ is automatically rotated for a space equal to the angular distance between the projections $k'$, by means of an anchor or pair of pallets, $m$, connected with the armature-lever $e$. The said pallets $m$ co-operate with a toothed wheel, $n$, on the shaft $k$. The teeth are pointed so as to be actuated by the pallets $m$, when pressed against them, and correspond in number and angular position with the different projections $k'$ of the shaft, and at each to-and-fro movement of the armature-lever $e$ the said shaft $k$ is rotated for the space of one tooth of the said wheel $n$, so as to bring another projection, $k'$, into engagement with another one of the circuit-closers $h$, thus providing a circuit for the circuit-closer $i$ at another station than the one from which the magnet was just operated, and as this is the only station for which a circuit is provided the watchman must proceed to the said station next, and then operate the circuit-closer $i$, in order to obtain a record, since the operation of the circuit-closer at any other station would produce no effect upon the magnet $f$, because of the break in the circuit at $h$ in all the other branch circuits. The watchman thus has to make the circuit of the different stations in a definite predetermined order, as the operation of producing a record from each station automatically connects the recording apparatus with the next station to be visited, and with that station only.

The arbor $d$ has a frictional connection with the arbor that is carried positively by the train of wheel-work of the clock, so as to enable the frame $c^3$ and shaft $c$ to be turned to any desired position so as to indicate the correct time on the dial.

In order to more clearly show the working of our improved time-detector, we have marked each binding-post of the clock with a number corresponding to the number of the station with which it is connected by the branch wire 3, there being twelve binding-posts connected to twelve stations, and one additional post connected by wire 5 to one pole of the battery, the other pole of which is shown as being connected to one member of the circuit-closer $i$ of station 12. We have also shown the circuit-closer $i$ at station 8 as closed, it being supposed that the watchman is making his record by closing the said circuit at the said station.

The circuit of the magnet $f$, as shown in Fig. 7, can be traced from the positive pole of the battery $B^2$ to the circuit-closer $i$ of station 8 by the line 4, from station 8 by the branch wire 3 to the contact-piece $h$, connected by wire 21 to the binding-post 8, the said contact-piece co-operating with the contact-piece $k'$, from the said contact-piece $k'$ to one terminal of the magnet $f$ by the shaft $k$ and wire 2, and thence from the other terminal of the said magnet back to the negative pole of the battery by the wire 5.

It becomes evident, on inspection of the diagram, that the circuit-controlling device $h\ k'$, corresponding to station 8, is the only one in electrical connection, so that a record cannot be made from any station, except station 8, by the watchman operating the circuit-closer $i$ at any of the said stations, inasmuch as the circuit-controlling device $h\ k'$ of every circuit, except the circuit of station 8, remains open until the watchman closes the circuit-closer $i$ of station 8, when the electro-magnet $f$, becoming magnetized, attracts its armature, thereby making a record, and at the same time rotating the shaft $k$ by means of the pallets $m$, as hereinbefore described, thereby placing the circuit-controlling device $h\ k'$ of station 9 in connection and disconnecting the circuit-controlling device $h\ k'$ of station 8. After the record has been made from station 8, the next station in order to be visited by the watchman is station 9, and it is the only station from which the record can be made, as described above.

We claim—

1. The dial having spirally-arranged graduations and the stationary gear, combined with the screw-threaded shaft provided with a pinion meshing with the said gear, the marking device having a nut engaging the said arm, a clock-work or motor producing a revolving movement of the said shaft and consequent spiral movement of the said marking device over the dial, and an electro-magnet armature, and circuit-changing and circuit-closing devices connecting said electro-magnet in circuit with but one station at a time, successively, substantially as described.

2. The dial and marking device and electro-magnet for actuating the latter, operated by circuit-closers at different stations, combined with a circuit-changing device actuated by the said magnet, when energized by closing its circuit at a given station, to automatically place the said magnet in circuit with the station next to be visited only, and at the same time disconnecting it from the station from which the said magnet was operated, substantially as described.

3. The stationary dial and stationary gear combined with the threaded shaft provided with a pinion meshing with the said gear, a clock-work or motor for revolving the said shaft, a marking device provided with a movable nut capable of being engaged with or disengaged from the threaded shaft, and an electro-magnet and armature therefor connected with the said shaft, and circuit changing and closing devices connecting said electro-magnet in circuit with but one station at a time, and only successively, substantially as and for the purpose described.

4. The stationary dial provided with spirally-arranged graduations or divisions and the stationary gear combined with the frame $c^3$, and shaft having bearings therein, and threaded arm provided with a pinion, the clock-work or motor for revolving the said frame, and the marking device on the said shaft provided with a nut engaging the threads thereof, and an upright engaging the frame $c^3$, and an electro-magnet and its armature connected with the said shaft, and circuit-changing and circuit-closing devices connecting said electro-magnet in circuit with but one station at a time, and only successively, substantially as described.

5. The dial and revolving shaft provided with a marking device, combined with the electro-magnet and its armature for actuating the said arm independently of its revolving movement, a series of branch circuits from said magnet to the different stations from which it is to be operated, normally-open circuit-closers in the said branches, and a circuit-changing device operated by the armature of the magnet which actuates the shaft and marking device, whereby but one of the said circuit-closers is closed at a time and a different one is closed at each operation of the magnet-armature, substantially as described.

6. The dial-marking devices and clock-work whereby one receives a uniform or timed movement with relation to the other, combined with the electro-manget for actuating the said marking devices, a series of branch circuits from the said magnet to the different stations at which it is to be operated, a normally-open circuit-closer in each of the said branches, and a circuit-controlling device consisting of a shaft provided with projections whereby the said circuit-closers are closed one at a time in the revolution of the shaft, a toothed wheel connected with the said shaft, and co-operating pallets actuated by the armature-lever of the said magnet, whereby the said shaft is turned and a different circuit-closer closed at each operation of the said armature lever, substantially as described.

7. The clock-work or motor and arbor actuated thereby, provided with an arm, combined with the frame pivoted on said arm, and threaded shaft having bearings in the said frame and provided with a pinion, the stationary gear meshing with the said pinion, and the sleeve longitudinally movable on the said arbor connected with the threaded shaft, and means for actuating the said sleeve, substantially as described.

In testimony whereof we have signed our names to this specification in the presence of two subscribing witnesses.

JAMES E. TARBOX.
EUGENE H. TAYLOR.

Witnesses:
DAVID O. ALLEN,
CHARLES LEIGHTON.